(12) United States Patent
Siemers

(10) Patent No.: US 8,894,333 B2
(45) Date of Patent: Nov. 25, 2014

(54) FASTENING MEANS WITH A COATING CONTAINING FILLING MATERIAL

(71) Applicant: Raimund Beck Nageltechnik GmbH, Mauerkirchen (AT)

(72) Inventor: Stefan Siemers, Burghausen (DE)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 134 days.

(21) Appl. No.: 13/675,038

(22) Filed: Nov. 13, 2012

(65) Prior Publication Data

US 2014/0133934 A1    May 15, 2014

(51) Int. Cl.
*F16B 1/00*    (2006.01)
*F16B 39/22*    (2006.01)

(52) U.S. Cl.
CPC .................................. *F16B 39/225* (2013.01)
USPC ......................................... 411/82.2; 411/82.3

(58) Field of Classification Search
USPC ........................ 411/82, 82.2, 82.3, 914, 920
See application file for complete search history.

(56) References Cited

U.S. PATENT DOCUMENTS 3,355,205 A * 11/1967 Wagner et al. ................... 403/11
3,485,132 A * 12/1969 Hanny et al. .................. 411/548
3,639,137 A * 2/1972 Marinelli ................... 428/321.5
3,746,068 A * 7/1973 Deckert et al. ................. 411/258
3,813,985 A * 6/1974 Perkins .......................... 411/442
3,814,156 A    6/1974 Bachmann et al.
3,936,407 A    2/1976 Parkinson
4,164,971 A * 8/1979 Strand ............................ 411/301
4,692,988 A    9/1987 Shulver et al.
5,178,903 A    1/1993 Lat et al.
5,193,958 A * 3/1993 Day ................................. 411/82
6,659,700 B1 * 12/2003 Farrell et al. ................... 411/450
7,195,437 B2 * 3/2007 Sakamoto ..................... 411/82.3
7,950,885 B2 * 5/2011 Rosenkranz ................. 411/82.2

FOREIGN PATENT DOCUMENTS

| DE | 2201496 A1 | 8/1972 |
| DE | 2247468 A1 | 4/1973 |
| DE | 4028133 C2 | 12/1998 |
| DE | 69422797 T2 | 7/2000 |
| EP | 1493930 A2 | 1/2005 |
| EP | 1959152 A2 | 8/2008 |
| WO | 2007/145833 A2 | 12/2007 |

* cited by examiner

*Primary Examiner* — Roberta Delisle
(74) *Attorney, Agent, or Firm* — Berenato & White, LLC

(57) ABSTRACT

The present invention relates to a fastening means, in particular a nail, a profiled nail, a nail-screw or a screw, the fastening means being coated at least partially with a coating composition containing a polymer bonding agent. Furthermore, the invention relates to a coating composition for finishing a fastening means and moreover to the use of the coating composition according to the invention.

20 Claims, 1 Drawing Sheet

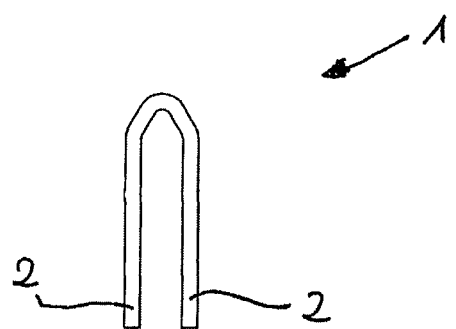

FASTENING MEANS WITH A COATING CONTAINING FILLING MATERIAL

The present invention relates to a fastening means, in particular a nail, a profiled nail such as for example a screw nail or a ring nail, a nail-screw, a screw or a clamp, the fastening means being coated at least partially with a coating composition containing a polymer bonding agent. Furthermore, the invention relates to a coating composition for finishing a fastening means and moreover to the use of the coating composition according to the invention.

Fastening means in the form of nails have been used to join components, in particular those made of wood, since time immemorial. These nails are made, for example, of wood or metallic materials and are driven through the materials to be joined at the desired connection points. This type of connection can be established relatively quickly and without any complicated tools. However, the durability is not satisfactory in every case. In particular when joining wooden components that are exposed to atmospheric conditions due to which the wood is constantly "performing", the nails may become loose over time. The connection then often no longer has the required strength.

In order to overcome this problem, in the past coatings for nails, profiled nails, nail-screws and screws have been developed which increase the pull-out values of these fastening elements and so improve the durability of a connection established with these fastening elements.

A coating composition of the type specified at the start is known from the prior art. DE 2 201 496 A1 thus discloses a metal fastening element with a hard, smooth coating and a method for producing this type of fastening element and a coating material which is provided in particular for coating nails. The coating material is made up of a combination of two thermoplastic resins, one of which comprises an ethylene co- or terpolymer containing carboxyl groups and a resin similar to colophonium. The fastening means provided with this type of coating material should display increased pull-out values in comparison to uncoated fastening means.

Furthermore, DE 40 28 133 C1 discloses a coated metallic fastening element which is substantially completely coated with a thermoplastic, predominantly aliphatic polyurethane coating for use in wooden structures. Furthermore, it is disclosed that the metallic fastening element can have a zinc layer and a chromate conversion layer in order to increase resistance to corrosion. The pull-out values should also be improved here in comparison to uncoated nails with the aid of the thermoplastic polyurethane coating.

The aforementioned solutions are not satisfactory in every respect. Despite the use of nails coated with these materials joints formed in this way can therefore become loose.

Proceeding from here, the object underlying the present invention was to provide a fastening means of the type specified at the start with improved pull-out values.

This object is achieved by a fastening means, in particular a nail, a profiled nail, a nail-screw, a screw or a clamp, the fastening means being coated at least partially with a coating composition containing a polymer bonding agent, and that is characterised in that the coating composition contains filling material.

The invention relates furthermore to a coating composition for a fastening means, in particular for a nail, a profiled nail, a nail-screw, a screw or a clamp, the composition containing a polymer bonding agent and which is characterised in that it additionally contains filling material. Moreover, the composition can adopt all of the configurations described above for the fastening means.

Further subject matter of the present invention relates to the use of a composition according to the invention for at least partially coating a fastening means, in particular in order to increase the pull-out value of the fastening means.

During the development work carried out for the present invention, it was shown that surprisingly, by using filling materials the pull-out values of fastening means coated in this way are improved in comparison to unfilled coating compositions.

According to one particularly preferred embodiment of the invention the coating composition contains 2 to 80% by volume of filling materials in relation to the quantity of filling materials used, in particular 5 to 70% by volume, preferably 7 to 60% by volume. It has been shown that compositions with these filling material contents have a particularly advantageous effect upon the increase of the pull-out values of the fastening means coated with such compositions. This effect is therefore already introduced with the relatively small portions of the aforementioned filling materials and intensifies as the amount of filling material increases.

The aforementioned filling material contents relate to the percent by volume of filling materials in the form of bulk volume before the latter is mixed, for example, with a liquid bonding agent composition. Since during this mixing process the liquid bonding agent composition penetrates into the cavities between the loosely filled filling materials and replaces the volume of air here, somewhat more than 100 ml coating composition can be produced for example from 100 ml filling materials and 50 ml liquid bonding agent composition.

A plurality of different filling materials can be used for the composition according to the invention, such as for example particulate, coating-type or fibre-type filling materials and also mixtures of the aforementioned filling materials.

As regards the sizes of the filling materials used, the average diameter of the particulate or coating-type filling material is 1 to 500 µm, in particular 5 to 300 µm, preferably 10 to 100 µm. The average diameter can be determined, for example, by electron microscope images, the average value being formed from at least 100 filling material diameters.

With coating-type filling materials the aforementioned value ranges relate to the dimensions of the flat side. The thickness of the coating-type filling materials is typically at most 20% of the average diameter, preferably at most 15% of the average diameter or even at most 10%. Typical thicknesses of coating-type filling materials are for example approximately 0.01 to 20 µm, in particular 0.05 to 10 µm, preferably 0.1 to 1 µm.

As regards the chemical nature of the particulate filling materials, these can be of organic or also inorganic origin. Particularly suitable filling materials of the aforementioned type are for example silica particles, such as pyrogenic silicic acid or precipitated silicic acid, foam glass particles, sand, clay, chalk, gypsum, talc, glass, ceramic, wood, plastic, in particular polyvinyl chloride or mixtures of the aforementioned filling materials.

The particulate filling materials can be irregular in form or, as is preferred for specific applications, be spherical or hemispherical in form. In this case microspheres, open or closed hollow microspheres and mixtures of the latter are preferred. Of these, ceramic microspheres, plastic microspheres or glass microspheres and the respective hollow microspheres can in particular be used. The coating-type filling materials that can be used for the composition according to the invention can be chosen for example from glass flakes, foam glass platelets, coating silicates or from mixtures of the latter.

As already stated above, the filling materials used according to the invention can also be distinct like fibres. In an advantageous configuration these have an average diameter of 5 to 300 μm and a length of 50 to 3,000 μm. Fibres with an average diameter of 10 to 250 μm, 15 to 180 μm or 20 to 170 μm are also suitable. The length of the fibres can advantageously be in the range of between 80 and 2,000 μm, in particular between 100 and 1,800 μm.

According to the invention natural fibres, in particular cotton, hemp, flax, jute or sisal fibres, carbon fibres, milled carbon fibres, plastic fibres such as polyamide, polyester, polyacrylonitrile, polypropylene, polyvinyl alcohol, aramid or polyester fibres, viscose fibres, glass fibres, milled glass fibres, mineral fibres or mixtures of the latter, for example, can be used. The aforementioned milled fibres have, for example, a fibre length of approximately 50 or 60 μm.

With the diameters and lengths specified above, it goes without saying that the diameter is basically smaller than the length of the fibres, the aspect ratio, i.e. the ratio of the length to the average diameter of the fibre-type filling materials preferably being at least 2:1, in particular at least 5:1.

As regards the polymer bonding agent used according to the invention, for this purpose in principle all polymer bonding agents which are suitable for coating fastening means can therefore be used. These are in particular those which adhere well to metal surfaces. The polymer bonding agents used within the framework of the present invention can therefore be chosen from polyacrylates, polyvinyl chlorides, polyurethanes, polyamides, polyesters, alkyd resins, polyvinyl acetates, polybutadiene styrenes, polyvinylidenes, polychloroprenes, rubbers, maleinates, polyolefins, epoxides, silicones, silane-terminated polymers such as silane-terminated polyurethanes, polyamides and polyoxyalkylenes, and the co- and terpolymers of the latter or mixtures of the latter.

In addition to the polymer bonding agents the composition according to the invention can furthermore contain a solvent. Water or an organic solvent such as acetone, methyl-ethyl-ketone, ethyl acetate, aromatic hydrocarbons such as toluene or xylene, aliphatic hydrocarbons such as hexane or heptane, halogenated hydrocarbons or mixtures of the latter, for example, can be used for this purpose.

It is also possible, however, for the composition according to the invention to contain no solvents, but for the polymer bonding agent to constitute a reactive system. Cyanoacrylates or silicone or silane prepolymers, as well as also 1-K or 2-K polyurethane precursors or also other mixtures which produce the polymer bonding agents specified at the start by means of a polymerisation reaction, for example, can be used for this purpose.

Furthermore, provision can be made such that the composition according to the invention contains at least one additive. This can be chosen from tackifiers, adhesive agents, softeners, corrosion inhibitors, stabilisers, dispersion aids, dyes, pigments or mixtures of the latter. Particularly advantageous with the aforementioned additives is the use of tackifiers, for example in the form of adhesion-creating resins such as colophonium or colophonium derivatives. The advantage is that the tackifiers improve the adhesiveness and the cohesion of the composition according to the invention and in this way anchor the filling materials contained in the composition more securely in the surface of the fastening means by driving the fastening means into a substrate.

Surprisingly it has been shown that the pull-out values of specific types of fastening means can particularly advantageously be increased by specific types of filling material. However, it is advantageous in every case that when the fastening means has a shaft, the coating composition is applied in the region of the shaft.

The pull-out values of nails can therefore be specifically increased in a particular manner by spherical or hemispherical filling materials. Preferred embodiments of the fastening means according to the invention accordingly consist of the fastening means being a nail and the filling materials being at least partially spherical or hemispherical in form, and in particular being chosen from hollow plastic microspheres, plastic microspheres, hollow glass microspheres, glass microspheres, ceramic microspheres or hollow ceramic microspheres or from mixtures of the latter, the composition preferably being applied in the region of the shaft of the nail.

In contrast to this, fibre-type filling materials have proven to be particularly advantageous for the coating of nail-screws. In this respect a further particularly preferred embodiment of the fastening means according to the invention consists of this being a nail-screw and the filling materials being at least partially like fibres, the composition preferably being applied in the region of the shaft of the nail-screw, in particular in the region of the thread.

If the fastening means are in particular a two-arm clamp, natural fibres, in particular cotton, hemp, flax, jute or sisal fibres, carbon fibres, milled carbon fibres, plastic fibres such as polyamide, polyester, polyacrylonitrile, polypropylene, polyvinyl alcohol, aramid or polyester fibres, viscose fibres, glass fibres, milled glass fibres, mineral fibres or mixtures of the latter are particularly suitable.

The present invention is described in more detail below using a number of exemplary embodiments.

Materials Used:

Polymer Bonding Agent ST-2313:

In the individual examples shown below a respective commercially available base coating ST-2313 "yellow nail coating concentrate", available from UPACO Adhesives Division, WORTHEN Industries, Inc. has been used as a polymer bonding agent. This coating has the following composition:

| Ingredient | CAS # | EINECS No. | Concentration % |
|---|---|---|---|
| Acetone | 67-64-1 | 200-622-2 | 60.0-70.0 |
| Acryl copolymer | Proprietary | Polymer | 20.0-25.0 |
| Tackifying Resin* | Proprietary | — | 5.0-10.0 |
| Phenol, styrenated | 61788-44-1 | 262-975-0 | 3.0-5.0 |
| C.I. Solvent Yellow 14 | 842-07-9 | 212-668-2 | 0.5-1.0 |
| Adhesion promoter | Proprietary | — | 0.1-2.0 |

This coating is a concentrate which has been diluted before use with quantities of acetone specified for the respective examples.

"Beck blue" is a blue dye (Ciba Spezialitätenchemie Lampertheim GmbH) which has been added to the compositions thus identified in a quantity of 10% by volume.

Filling Materials Used:

Glass Spheres:

The glass spheres were glass microspheres with the product designation Anti-slip-Scatter-Substrate, Type SP-19, bacuplast Faserverbundtechnik GmbH, i.e. complete spheres. The average sphere diameter is 300 μm.

Jointing Sand:

The jointing sand used is a quartz sand made by Bayer. The average grain diameter is approximately 200 μm.

Glass Fibres:

The glass fibres used have an average length of 1,500 μm and an average fibre diameter of 150 μm and can be obtained under the product designation Glass Fibres, Powdered, bacuplast Faserverbundtechnik GmbH.

Hollow Glass Spheres:

The hollow glass spheres were hollow glass microspheres with the product designation Microballoons Q-21, bacuplast Faserverbundtechnik GmbH, i.e. hollow spheres. The average sphere diameter is 150 μm.

Carbon Fibres:

The carbon fibres used have an average length of 60 μm and an average fibre diameter of 67 tex and can be obtained under the product designation Tenax®-A HAT M100, Toho Tenax Europe GmbH.

Milled Glass Fibres:

The glass fibres used have an average length of 50 μm and an average fibre diameter of 14 μm and can be obtained under the product designation MF 7904, Lanxess Central Eastern Europe s.r.o.

Cotton Fibres:

The fibres were cotton fibres with the product designation Cotton Flakes, bacuplast Faserverbundtechnik GmbH. The average fibre length is 2 mm.

Fastening Means Used:

31/82 bk=bare nail, diameter 3.1 mm, shaft length 82 mm
31/75 bk=bare nail, diameter 3.1 mm, shaft length 75 mm
Scrail 28/32×75=nail-screw, core diameter 2.8 mm, external diameter 3.2 mm, shaft length 75 mm
Sub-Lock® Scrail 28/32×75=dimensions as for Scrail 28/32×75, company Raimund Beck Nageltechnik GmbH, nail-screw coated with a conventional nail resin without filling materials
Spax screw 4.0×70=conventional wooden screw Wooden Substrates Used:

Spruce: with a characteristic density of 350 kg/m$^3$ and a relative moisture of 65% at 20° C. ambient temperature according to DIN EN 14592

ACQ: This is alkaline copper quaternary pressure-impregnated Southern yellow pine wood, as typically used in the USA for pull-out tests.

Reference Value Specification:

Due to the great variation in the pull-out values occurring with one and the same type of wood, for each specimen a reference value was first of all determined which reflects the strength of the wooden specimen. For this purpose a bare smooth-shafted nail with the diameter 3.1 mm×59 mm was driven into the specimens. 24 hours after this the reference nails were pulled out. The values of the individual specimens therefore reflect the wood-dependent variation, in consideration of which the specimens were compared with one another.

Production of the Coating Composition:

Different coatings were respectively produced based on base coating ST-2313. For this purpose the coating concentrate ST-2313 was first of all presented and displaced with respectively specified quantities of acetone and stirred until homogeneous. The specified quantities relate respectively to the mix ratio of acetone to coating concentrate. The compositions identified as "Beck Blue" were additionally displaced to a blue dye.

With the coating compositions which already contain filling materials before application, the respective filling materials were initially presented in a container in the quantity specified. If no other quantity ratios are specified, sufficient polymer bonding agent was then added such that the latter reaches the fill height of the filling materials, i.e. in principle fills up the spaces in the loosely filled filling material.

Volume Ratio:

100 ml glass spheres
45 ml ST2313 coating with 2:1 acetone dilution
100 ml glass fibres
55 ml ST 2313 coating with 2:1 acetone dilution Application of the Coating:

The step of coating was implemented either with the aid of a coating machine or manually by immersing the respective fastening means in the coating composition.

The coated fastening means produced according to both application methods were then dried at room temperature.

Test Methods:

The pull-out value was determined according to the DIN 1052 specification of August 2004, in particular according to the specifications in Annex C.

In the test results compiled in the following tables different fastening means (BFM) are provided with different coating compositions according to the methods specified above, the pull-out value of which is tested 24 hrs after driving in, the values specified constituting average values of 10 tests respectively according to the above-specified DIN 1052.

The specimens were driven in with even distribution over the specimen wood/the specimen woods with a pneumatic setting tool. After 24 hours the fastening means were drawn out of the wood one after the other with a calibrated traction/pressure testing machine. The maximum value achieved here corresponds to the pull-out force.

The results are presented as follows:

| Wood | Drive-in depth | BFM | Coating | Coating | Acetone: Coating ratio | Filling material | Pull-out value/kp | Reference value/kp |
|---|---|---|---|---|---|---|---|---|
| Spruce | 60 | 31/82bk | Machine | ST2313 | 2:1 | | 126 | 75 |
| Spruce | 60 | 31/82bk | Manual | Beck blue | 3:1 | | 129 | 75 |
| Spruce | 55 | 31/75bk | Manual | ST2313 | 2:1 | Glass spheres | 321 | 74 |
| Spruce | 55 | 31/75bk | Manual | ST2313 | 2:1 | | 276 | 74 |
| Spruce | 55 | Scrail28/32x75 | Manual | ST2313 | 2:1 | Glass spheres | 294 | 74 |
| Spruce | 55 | Scrail28/32x75 | Manual | ST2313 | 2:1 | | 267 | 74 |
| Spruce | 35 | Scrail28/32x57 | Manual | ST2313 | 2:1 | Glass spheres | 152 | 63 |
| Spruce | 35 | Scrail28/32x57 | Machine | Beck blue | 2:1 | | 124 | 63 |
| Spruce | 40 | Scrail28/32x57 | Manual | ST2313 | 2:1 | Glass spheres | 167 | 81 |
| Spruce | 40 | Scrail28/32x57 | Machine | Beck blue | 2:1 | | 146 | 81 |
| Spruce | 40 | Scrail28/32x57 | Manual | ST1735 | 3:1 | Glass spheres | 149 | 81 |

-continued

| Wood | Drive-in depth | BFM | Coating | Coating | Acetone: Coating ratio | Filling material | Pull-out value/ kp | Reference value/ kp |
|---|---|---|---|---|---|---|---|---|
| Spruce | 40 | Scrail28/32x57 | Machine | Beck blue | 2:1 | | 146 | 81 |
| ACQ | 40 | Scrail28/32x57 | Manual | ST2313 | 2:1 | Glass spheres | 208 | 50 |
| ACQ | 40 | Scrail28/32x57 | Machine | Beck blue | 2:1 | | 186 | 50 |
| ACQ | 40 | Scrail28/32x57 | Manual | ST1735 | 3:1 | Glass spheres | 186 | 50 |
| ACQ | 40 | Scrail28/32x57 | Machine | Beck blue | 2:1 | | 186 | 50 |
| ACQ | 35 | Scrail28/32x57 | Manual | ST2313 | 2:1 | Glass spheres | 215 | 58 |
| ACQ | 35 | Scrail28/32x57 | Machine | Beck blue | 2:1 | | 190 | 58 |

With the coatings listed here, the filling materials specified were respectively mixed with the polymer bonding agent before applying.

| Wood | Drive-in depth | BFM | Coating | Coating | Acetone: Coating ratio | Filling material | Pull-out value/ kp | Reference value/ kp |
|---|---|---|---|---|---|---|---|---|
| Spruce | 35 | Scrail28/32x57 | Machine | Beck blue | 2:1 | | 124 | 63 |
| Spruce | 35 | Scrail28/32x57 | Manual | ST2313 | 2:1 | Glass fibres | 152 | 63 |
| ACQ | 35 | Scrail28/32x57 | Machine | Beck blue | 2:1 | | 190 | 58 |
| ACQ | 35 | Scrail28/32x57 | Manual | ST2313 | 2:1 | Glass fibres | 215 | 58 |
| Spruce | 40 | Scrail28/32x57 | Machine | Beck blue | 2:1 | | 146 | 81 |
| Spruce | 40 | Scrail28/32x57 | Machine | Beck blue | 2:1 | | 146 | 81 |
| Spruce | 40 | Scrail28/32x57 | Manual | ST1735 | 3:1 | Glass fibres | 149 | 81 |
| Spruce | 40 | Scrail28/32x57 | Manual | ST2313 | 2:1 | Glass fibres | 167 | 81 |
| ACQ | 40 | Scrail28/32x57 | Machine | Beck blue | 2:1 | | 186 | 50 |
| ACQ | 40 | Scrail28/32x57 | Manual | ST1735 | 3:1 | Glass fibres | 186 | 50 |
| ACQ | 40 | Scrail28/32x57 | Machine | Beck blue | 2:1 | | 186 | 50 |
| ACQ | 40 | Scrail28/32x57 | Manual | ST2313 | 2:1 | Glass fibres | 208 | 50 |
| Spruce | 55 | Scrail28/32x75 | Manual | ST2313 | 2:1 | | 267 | 74 |
| Spruce | 55 | Scrail28/32x75 | Manual | ST2313 | 2:1 | Glass fibres | 294 | 74 |

With the coatings listed here the filling materials specified were respectively mixed with the polymer bonding agent before application. The coating composition filled with glass fibres led with all drive-in depths to an increase of the pull-out values of approximately 10 to 14%.

Spruce:
Reference value of the wood: 74.1 kp

| Designation | Pull-out value in kp |
|---|---|
| RN 31/75 smooth bare ST 2313 Acetone: Bonding agent ratio 2:1 | 276.2 |
| RN 31/75 smooth bare ST 2313 Acetone: Bonding agent ratio 2:1 scattered with glass spheres | 248.7 |
| RN 31/75 smooth bare ST 2313 Acetone: Bonding agent ratio 2:1 mixed with glass spheres approx. 30% by volume | 284.9 |
| Scrail 28/32 × 75 ST 2313 Acetone: Bonding agent ratio 2:1 | 267.2 |
| Scrail 28/32 × 75 ST 2313 Acetone: Bonding agent ratio 2:1 scattered with glass spheres | 258.6 |
| Scrail 28/32 × 75 ST 2313 Acetone: Bonding agent ratio 2:1 mixed with glass spheres approx. 30% by volume | 268.0 |
| RN 31/75 smooth bare ST 2313 Acetone: Bonding agent ratio 2:1 mixed with glass spheres | 321.7 |
| Scrail 28/32 × 75 ST 2313 Acetone: Bonding agent ratio 2:1 mixed with glass spheres | 271.9 |
| RN 31/75 smooth bare ST 2313 Acetone: Bonding agent ratio 2:1 mixed with glass fibres | 267.8 |
| Scrail 28/32 × 75 ST 2313 Acetone: Bonding agent ratio 2:1 mixed with glass fibres | 293.8 |

Drive-in depth respectively 55 mm; time difference between driving in and pulling out was respectively 24 hrs.
Spruce:
Reference value of the wood: 88.0 kp

| Designation | Pull-out value in kp |
|---|---|
| RN 31/75 smooth bare ST 2313 Acetone: Bonding agent ratio 2:1 | 273.1 |
| RN 31/75 smooth bare ST 2313 Acetone: Bonding agent ratio 2:1 mixed with glass spheres | 325.4 |
| RN 31/75 smooth bare ST 2313 Acetone: Bonding agent ratio 2:1 mixed with jointing sand | 279.6 |
| Scrail 28/32 × 75 ST 2313 Acetone: Bonding agent ratio 2:1 | 219.5 |
| Scrail 28/32 × 75 ST 2313 Acetone: Bonding agent ratio 2:1 mixed with glass fibres | 243.2 |
| Scrail 28/32 × 75 ST 2313 Acetone: Bonding agent ratio 2:1 mixed with jointing sand | 209.0 |
| Sub-Lock Scrail 28/32 × 75 | 213.0 |
| Spax screw 4.0 × 70 thread length 45 mm | 421.0 |
| Spax screw 3.5 × 50 thread length 30 mm | 225.6 |

Drive-in depth respectively 55 mm; time difference between driving in and pulling out was respectively 24 hrs.
Spruce:
Reference value of the wood: 62.6 kp

| Designation | Pull-out value in kp |
|---|---|
| Sub-Lock Scrail 28/32 × 57 | 124.0 |
| Scrail 28/32 × 57 ST 2313 Acetone: Bonding agent ratio 2:1 mixed with glass fibres | 152.0 |

ACQ:
Reference value of the wood: 57.5 kp

| Designation | Pull-out value in kp |
|---|---|
| Sub-Lock Scrail 28/32 × 57 | 190.3 |
| Scrail 28/32 × 57 ST 2313 Acetone: Bonding agent ratio 2:1 mixed with glass fibres | 214.5 |

Spruce:
Reference value of the wood: 95.87 kp

In the following compositions too the same bonding agent ST 2313 in the ratio acetone:bonding agent 2:1 was used. The mix ratio was not filled to saturation of the filling materials here however. The portions were measured individually in the desired volumes and then put together.

| Designation | Pull-out value in kp |
|---|---|
| Scrail 28/32 × 75 carbon fibres resin: fibres ratio 88 g/8 g | 271.8 |
| Scrail 28/32 × 75 carbon fibres resin: fibres ratio 88 g/15 g | 268.3 |
| Scrail 28/32 × 75 carbon fibres resin: fibres ratio 88 g/30 g | 278.5 |
| Scrail 28/32 × 75 carbon fibres resin: fibres ratio 88 g/60 g | 275.0 |
| Scrail 28/32 × 75 carbon fibres resin: fibres ratio 88 g/70 g (saturation) | 275.1 |
| Scrail 28/32 × 75 cotton fibres resin: fibres ratio 88 g/5 g | 270.4 |
| Scrail 28/32 × 75 cotton fibres resin: fibres ratio 88 g/10 g | 309.6 |
| Scrail 28/32 × 75 cotton fibres resin: fibres ratio 88 g/15 g (saturation) | 300.2 |
| Scrail 28/32 × 75 ST2313 resin: fibres ratio 2:1 | 228.9 |

Drive-in depth respectively 60 mm; time difference between driving in and pulling out was respectively 24 hrs.
Spruce:
Reference value of the wood: 55.84 kp In the following compositions too the same bonding agent ST 2313 in the ratio acetone:bonding agent 2:1 was used

| Designation | Pull-out value in kp |
|---|---|
| RN 31/75 smooth ST 2313 resin: fibres ratio 2:1 | 299.5 |
| RN 31/75 smooth hollow glass spheres resin: fibres ratio 88 g/2 g | 241.5 |
| Scrail 28/32 × 75 ST 2313 resin: fibres ratio 2:1 | 200.1 |
| Scrail 28/32 × 75 carbon fibres resin: fibres ratio 88 g/60 g | 245.2 |
| Scrail 28/32 × 75 milled glass fibres resin: fibres ratio 96 g/60 g | 209.2 |
| Scrail 28/32 × 75 milled glass fibres resin: fibres ratio 96 g/120 g | 229.8 |
| Scrail 28/32 × 75 milled glass fibres resin: fibres ratio 96 g/180 g (saturation) | 181.9 |

Drive-in depth respectively 60 mm; time difference between driving in and pulling out was respectively 24 hrs.

The examples summarised in the tables show that by using filling materials in coating compositions, the pull-out values can be increased in comparison to uncoated fastening means and fastening means only coated with unfilled nail resin.

The results show the surprising finding that the pull-out values of nails, in particular smooth nails, can be increased in particular by coating compositions which contain glass microspheres. In contrast, with nail-screws and screws, the pull-out value of the latter can be most clearly improved by using fibre-type filling materials in the coating composition.

When using clamps 1, as shown for example in FIG. 1, it was surprisingly established by tests that the pull-out values can be increased in particular by coating compositions which contain in addition to nail resin natural fibres, in particular cotton fibres, and the composition being applied in the region of clamp arms 2 formed on the clamp 1.

The invention claimed is:

1. A fastening means, in particular a nail, a profiled nail, a nail-screw, a screw or a clamp, the fastening means being coated at least partially with a coating composition comprising a polymer bonding agent and a filling material,
   wherein the filling materials are fibre-type filling materials having an average diameter of 5 to 300 µm and a length of 50 to 3,000 µm and preferably having a ratio of length to average diameter of 2:1 or more, in particular of 5:1 or more,
   the fibre-type filling materials are selected from the group consisting of natural fibres, in particular cotton, hemp, flax, jute or sisal fibres, carbon fibres, milled carbon fibres, plastic fibres such as polyamid, polyester, polyacrylonitrile, polypropylene, polyvinyl alcohol, aramid or polyester fibres, viscose fibres, glass fibres, milled glass fibres, mineral fibres or mixtures of the latter.

2. A fastening means, in particular a nail, a profiled nail or a clamp, the fastening means being comprising: a smooth surface coated at least partially with a coating composition comprising a polymer bonding agent, and a filling material, wherein the filling material comprises spherical or hemispherical particulates.

3. The fastening means according to claim 2, characterised in that the coating composition contains 2 to 80% by volume of filling materials in relation to the quantity of filling materials used, in particular 5 to 70% by volume, preferably 7 to 60% by volume.

4. The fastening means according to claim 2, wherein the spherical or hemispherical particulates have an average diameter of 1 to 500 µm, preferably 5 to 300 µm.

5. The fastening means according to claim 4, characterised in that the particulate filling materials are chosen from silica particles, such as pyrogenic silicic acid or precipitated silicic acid, from foam glass particles, sand, clay, chalk, gypsum, talc, glass, ceramic, wood, plastic, in particular polyvinyl chloride, or mixtures of the latter.

6. The fastening means according to claim 4, characterized in that the spherical or hemispherical particulates are chosen from the group consisting of microspheres, open or closed hollow microspheres and mixtures of the latter.

7. The fastening means according to claim 2, characterised in that the polymer bonding agent is chosen from polyacrylates, polyvinyl chlorides, polyurethanes, polyamides, polyesters, alkyd resins, polyvinyl acetates, polybutadiene styrenes, polyvinylidenes, polychloroprenes, rubbers, maleinates, polyolefins, epoxides, silicones, silane-terminated polymers, such as silane-terminated polyurethanes, polyamides and polyoxyalkylenes, and the co- and terpolymers of the latter or mixtures of the latter.

8. The fastening means according to claim 2, wherein the composition further comprises a solvent, in particular water or an organic solvent such as acetone, methyl-ethyl-ketone, ethyl acetate, aromatic hydrocarbons such as toluene or xylene, aliphatic hydrocarbons such as hexane, halogenated hydrocarbons or mixtures of the latter.

9. The fastening means according to claim 2, wherein the composition further comprises at least one additive chosen from the group consisting of tackifiers, adhesive agents, softeners, corrosion inhibitors, stabilisers, dispersion aids, dyes, pigments or mixtures of the latter.

10. The fastening means according to claim 2, characterised in that the fastening means has a shaft and the coating composition is applied in the region of the shaft.

11. The fastening means according to claim 2 wherein the spherical or hemispherical particulates are selected from the group consisting of hollow plastic microspheres, hollow glass microspheres, glass microspheres, ceramic microspheres or hollow microspheres or from mixtures of the latter.

12. The fastening means of claim 2, wherein the spherical or hemispherical particulates are hollow.

13. A coating composition for a fastener, in particular for a nail, or a screw nail or a screw, the composition comprising a polymer bonding agent and filling materials, wherein the filling materials comprise fibre-type material wherein each fibre of the fibre-type material has a length and a diameter where the length exceeds the diameter.

14. The coating composition of claim 13, wherein the fibre-type material is selected from the group consisting of natural fibres, in particular cotton, hemp, flax, jute or sisal fibres, carbon fibres, milled carbon fibres, plastic fibres such as polyamid, polyester, polyacrylonitrile, polypropylene, polyvinyl alcohol, aramid or polyester fibres, viscose fibres, glass fibres, milled glass fibres, mineral fibres or mixtures of the latter.

15. The coating composition of claim 13, wherein the filling materials further comprise at least one of a particulate material and a coating material.

16. The coating composition of claim 15, wherein the particulate material are spherical or hemispherical particulates selected from the group consisting of hollow plastic microspheres, plastic microspheres, hollow glass microspheres, glass microspheres, ceramic microspheres or hollow microspheres or from mixtures of the latter.

17. The coating composition of claim 15, wherein the coating material is selected from the group consisting of glass flakes, foam glass platelets, coating silicates or from mixtures of the latter.

18. The coating composition of claim 13, wherein the coating composition comprises 2 to 80% by volume of filling materials in relation to the quantity of filling materials used.

19. The coating composition of claim 13, wherein the fibre-type filling materials comprise an average diameter of 5 to 300 µm and a length of 50 to 3,000 µm.

20. The coating composition of claim 13, wherein a ratio of length to diameter of each fibre is in the range of 2:1 to 5:1.

* * * * *